OR 3,584,930

[redacted] [redacted]

SEARCH ROOM

United States

[11] 3,584,930

[72] Inventor James B. Reed Jr.
Naperville, Ill.
[21] Appl. No. 836,833
[22] Filed June 26, 1969
[45] Patented June 15, 1971
[73] Assignee Bell Telephone Laboratories Incorporated
Murray Hill, N.J.

[54] HOLOGRAM-WRITING APPARATUS PROVIDING PRECISE TRACKING OF A DEFOCUSED WRITE BEAM

1 Claim, 1 Drawing Fig.

[52] U.S. Cl. .......... 350/3.5, 350/285
[51] Int. Cl. .......... G02b 27/00
[50] Field of Search .......... 350/305, OSR, 285; 250/219; 340/173

[56] References Cited
UNITED STATES PATENTS
3,511,553 5/1970 Gerritsen et al. .......... 350/3.5
OTHER REFERENCES
Vitols, " IBM Technical Disclosure Bulletin, " Vol. 8, No. 11 April 1966, pp 1581— 3 (copy in 350/305)

*Primary Examiner*—David Schonberg
*Assistant Examiner*—Ronald J. Stern
*Attorneys*—R. J. Guenther and R. B. Ardis

ABSTRACT: A hologram-writing apparatus for an optical memory in which a defocused write beam is employed in conjunction with a reference beam to create an interference pattern and a divergent (rather than a collimated) light beam is applied to the writing lens to permit simultaneous movement of the latter lens and the hologram aperture. Precise tracking of the write beam and aperture are ensured.

INVENTOR
J. B. REED JR
BY William H. Kamstra
ATTORNEY

HOLOGRAM-WRITING APPARATUS PROVIDING PRECISE TRACKING OF A DEFOCUSED WRITE BEAM

BACKGROUND OF THE INVENTION

This invention relates to holographic information storage systems and, more particularly, to apparatus for generating holograms adapted for use in such systems.

Present-day information-handling systems, as they increase in size and complexity, present continuing demands for memories of greater capacity and faster access times. Although the capacities of known memory arrangements may be substantially increased, economic considerations frequently dictate that the increase in storage capacity be achieved only at the expense of access time. One attractive answer to the problems encountered in simultaneously obtaining an increase in storage capacity and a reduction in access time is a memory arrangement based on optics. The development of such a memory was in recent years given a renewed impetus with the advent of the laser as a source of coherent light. The storage of information is accomplished by the technique of holography in which two mutually coherent laser beams interfere to expose a photosensitive emulsion. One of the beams is converging as it passes through a data mask containing a "page" of information in the form of a coordinate array of bit locations at which the presence or absence of apertures represents binary "1's" and "0's", respectively. The readout of such a read-only memory in which the information is stored on a hologram is accomplished by focusing a read laser beam successively on the page locations of the hologram where at each bit location light is permitted to pass depending upon whether or not a "1" or a "0" is present at that point. The transmitted light may be detected, for example, by an array of phototransistors. The extremely high capacity and fast access rate of such a memory is apparent from the fact that a hologram 1 millimeter in diameter can store 10,000 bits of information and that each page can be read in its entirety by a single positioning of the laser read beam.

Holographic memories have in recent years received considerable comment in the literature and further details of their organization and operation are readily at hand. See, for example, the article by F. M. Smits and L. E. Gallagher, "Design Considerations for a Semipermanent Optical Memory," Bell System Technical Journal, July-August 1967, p. 1,267. Since the present invention is concerned chiefly with the generation of the information-bearing holograms and not their interrogation, the foregoing brief review will suffice as a context for this invention. Returning to a consideration of the storage of holographic information, one typical arrangement for producing the holograms containing the binary information will be described. The storage array is made on a special recording medium similar to conventional photographic film. A data mask is first constructed to represent the contents of a page of information to be written. As mentioned, the mask is simply an array of tiny holes which appear wherever in the array a binary "1" is to be stored, the mask being unapertured at the bit locations in the array where a binary "0" is stored. Each data mask is holographically recorded on the recording medium by a laser beam. The laser beam is split to form a reference portion which strikes the recording medium directly and a second, object portion which, after passing through a converging lens, illuminates the data mask. The two beams interact and form an interference pattern on the film. To ensure the proper positioning of each hologram page, a movable, apertured plate is placed between the data mask and the film to limit the exposed area to a specified location.

In a typical arrangement in which the data mask and hologram emulsion are maintained in fixed positions, a collimated laser beam is focused at the hologram aperture by means of a lens movable directly with the aperture plate as it defines on the emulsion the bounds of a data page. If the emulsion surface lies on the focal plane of the lens for collimated light, the light will always be precisely focused by the lens through the hologram aperture when the lens and aperture are moved together to write information pages at different locations on the medium. In this arrangement, the maximum intensity of the laser beam is directed at the page location of the emulsion. As a result, saturation of the emulsion at the focal point frequently occurs with an attendant reduction in definition between the stored binary images on the film. To correct for this at negligible cost in sharpness of focus, the hologram medium and the aperture plate are advantageously moved away from the focal point toward the data mask to direct a slightly blurred focus of the beam to write a hologram page. As a result, the writing operation is accomplished without exceeding the linear range of the emulsion.

Although saturation of the hologram emulsion is averted by employing a defocused beam, a new problem is now presented. It was mentioned in the foregoing that, with the focal point of the lens system lying in the hologram plane, during simultaneous movement of the lens and hologram aperture from page to page, the focus of the writing beam is maintained centrally on the aperture for all lens positions. In the case of the defocused beam, the focal point intersects the optical axis of the lens only when the latter is centered on the data mask. In any extreme position the beam fails completely to illuminate the hologram at the aperture point when the lens and aperture are moved together. As a result, it has been found necessary to arrange not only for the movement of the lens and aperture plate with respect to the hologram emulsion and data mask, but also with respect to each other. The precise relative movement of the lens and aperture plate to ensure alignment of the laser beam and aperture requires complicated servo apparatus which not only reduces the reliability of the system but adds substantially to its cost.

It is an object of the present invention to ensure the alignment of a defocused laser beam in a hologram-writing apparatus without relative movement between the lens and the hologram aperture plate.

Another object is the provision of a new and novel hologram-writing apparatus which permits the employment of a defocused write beam.

SUMMARY OF THE INVENTION

The foregoing and other objects of this invention are realized in one specific embodiment thereof in which the light input to the writing lens is slightly divergent rather than collimated as has been the case in prior-art arrangements. As a result, although the hologram aperture remains positioned in the focal plane of the writing lens for collimated light, the focus of the divergent beam lies behind the hologram medium surface. Saturation of the hologram emulsion is thus averted without introducing the necessity of independent relative movement of the writing lens and hologram aperture. This feature is advantageously achieved at negligible cost in reduction in the redundancy of the stored information.

BRIEF DESCRIPTION OF THE DRAWING

The objects and features of this invention will be better understood from a consideration of the detailed description of its organization and operation which follows when taken in conjunction with the single FIGURE of the drawing which shows largely in schematic and diagrammatic form the organization of one illustrative embodiment thereof.

DETAILED DESCRIPTION

Figure 1:
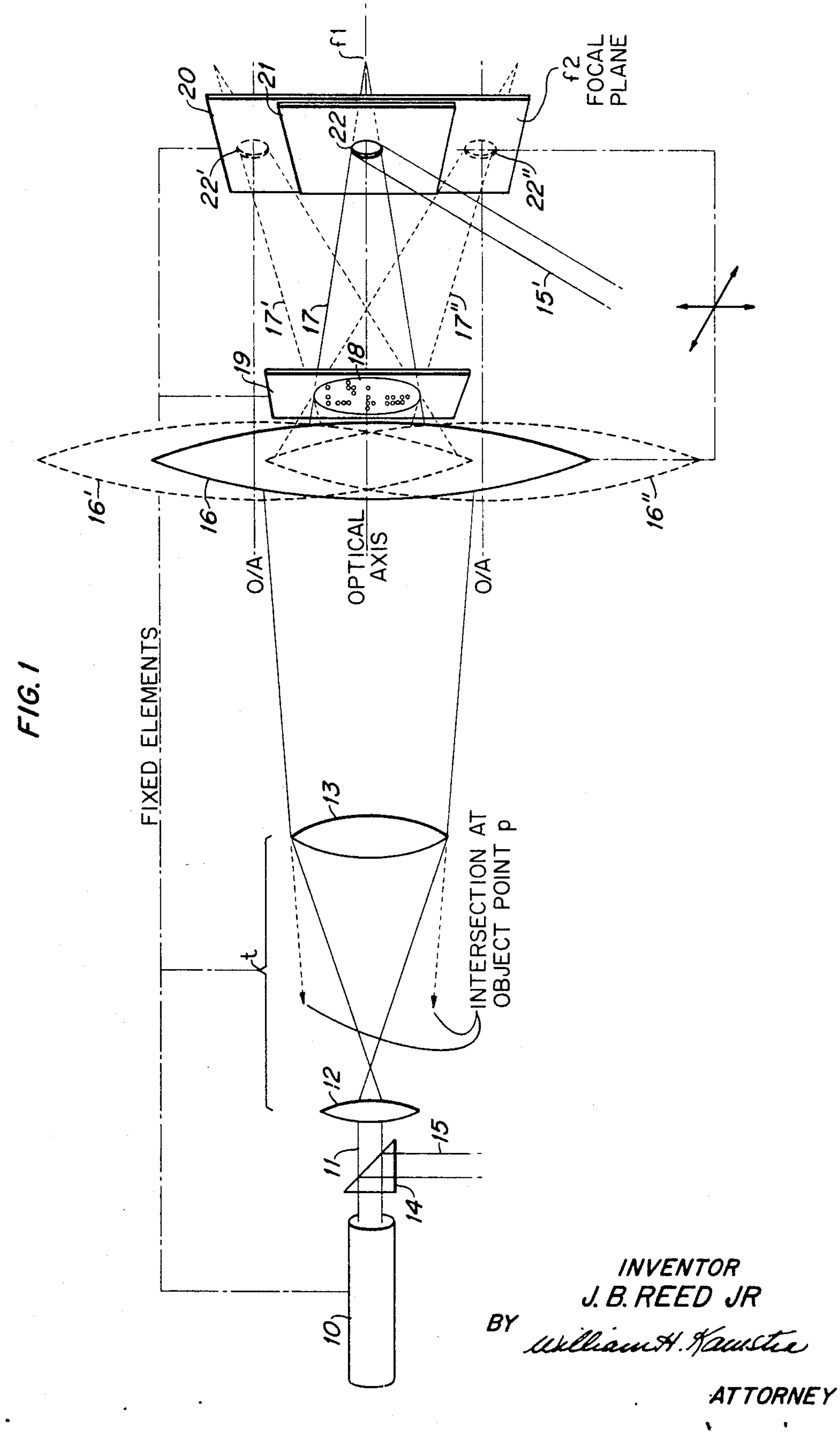

As depicted in the drawing, a detailed description of this invention is conveniently initiated with a source of coherent light 10 which may typically comprise, for example, a laser, the beam 11 of which is directed to an entrance lens 12 of a telescope portion *t* of the writing apparatus. The lens 12 focuses the laser beam 11 to an exit lens 13 of the telescope. A partial reflector 14, interposed between the source 10 and the lens 12, deflects a portion of the beam 11 in order to provide a reference beam 15 which subsequently is employed to achieve the interference pattern on the hologram medium to be described. Since the focusing and direction of the reference beam 15 together with its operation are readily envisioned by one skilled in the art, the intermediate structural details are omitted from the drawing for the sake of clarity. These details are also not required for an understanding of the organization and operation of the invention.

The exit lens 13 of the telescope *t* directs the light beam to a writing lens 16 which in turn focuses a converging beam 17 to accomplish the actual hologram writing operation in cooperation with the reference beam termination indicated in the drawing as the beam 15'. Positioned in the path of the beam 17 is a data mask 18 shown in the drawing for convenience as mounted in a frame 19. The data mask 18 is typically opaque and contains thereon a coordinate array of binary information which is to be written as a hologram. The data mask 18 represents a page of information including a large number of binary words, the binary "1's" and "0's" being represented respectively at the bit locations as the presence and absence of translucent apertures. In order to define a page location on the hologram medium 20, a plate 21 is provided having an aperture 22 therein and is positioned between the data mask 18 and medium 20. The mounting of the various elements of the writing apparatus thus far described has been omitted from the drawing for the sake of clarity and because such mounting arrangements will be obvious to one skilled in the art. Further, sufficient of the organization of a writing apparatus according to this invention is shown to teach its practice. Any suitable mounting arrangement will maintain fixed with respect to each other, the laser source 10, the reflector 14, the elements of the telescope *t*, the data mask 19, and the hologram medium 20. The optical axes of the source 10 and the telescope *t* lens also permanently coincide.

The writing lens 16 together with the aperture plate 21 are mounted with respect to the elements mentioned hereinbefore so that they are movable in identical displacements in vertical and horizontal directions. The fixed elements are so indicated in the drawing by connecting broken lines. The two movable elements are also so associated with the directions of movement symbolized by double-headed arrows. It will finally be appreciated that for every one hologram medium on which many pages of information are to be stored, a number of corresponding data masks will be employed, each to be replaced in some convenient manner by a succeeding one. In the drawing, the writing lens 16 is shown in a position with its optical axis coinciding with that of the telescope and with the axis of the aperture 22 of the plate 21. For the sake of description this position of the lens 16 will be assumed for the purpose of writing a central page on the medium 20. Two other positions are indicated in the drawing for the lens 16. Each for this description will be assumed to be the two extreme vertical positions employed during the writing of a complete hologram. It should be understood that, as symbolized in the drawing, but not explicitly shown, the lens 16 also is movable to two extreme horizontal positions to achieve, by coordinate vertical and horizontal movements, complete rectangular coverage of the hologram medium 20.

By returning briefly to the problem to which this invention is directed, the relative positions and distances between the writing lens 16 and hologram medium 20 will be clarified. In prior-art arrangements, the writing beam 17 is focused directly on the hologram emulsion surface with the aforementioned frequent result that the linear range of the emulsion is exceeded with an attendant degradation of the stored information. Notwithstanding the shortcomings of this prior mode of operation, conveniently in this arrangement, as the writing lens 16 and the aperture plate 21 are moved together to define different page locations on the medium 20, the beam 17 tracks precisely the center of the aperture 22. The telescope *t* in this case is adjusted to collimate its light beam output and the surface of the medium 20 lies in the focal plane of the writing lens 16 for a collimated input.

In accordance with the principles of the present invention, the beam 17 is employed to write on the emulsion surface 20, not at its focal point, *f1*, but rather at some small distance before this point is reached. As a result, a defocused beam is applied to the emulsion through the aperture 22 permitting the writing of information within the linear range of the emulsion. As is indicated in the drawing, when the axis of the aperture 22 lies in the optical axis of the writing lens 16, the beam 17 is also centered on the aperture 22 and, hence, on the page location on the medium 20 where the information is to be stored. However, when the input to the lens 16 is collimated, it was found that, not having the aperture 22 positioned in the plane of *f1*, in any position other than the coincident axis one shown in the drawing, the beam 17 no longer tracks the aperture 22 as the latter and the lens 16 are moved together to write at other page locations of the hologram medium. As previously mentioned, such a precise tracking of beam and aperture can be achieved but only at the cost of arranging for complicated and expensive apparatus for independently moving these elements with respect to each other. The necessity for such apparatus is advantageously obviated in accordance with this invention by adjusting the telescope *t* to direct a diverging beam to the writing lens 16.

The tracking improvement, as indicated in the drawing, is not apparent with the lens 16 and aperture 22 in their central position as shown. On the other hand, when the lens is in the position as shown by the lens 16' in dashed line form and the plate 21 moved to the same corresponding position so that the aperture 22' has its axis on the optical axis of the new position, the beam 17' will intersect the latter axis precisely. Similarly, with the lens in the position as indicated by the lens 16'' shown in dashed outline, its optical axis will also coincide with the aperture 22'' axis when the plate 21 is moved correspondingly. As a result, the new direction of the beam 17'' will be such as to intersect the new optical axis and aperture at the new hologram page location. Although only three positions of the lens 16 and aperture plate 21 have been considered it is to be understood that the precise tracking of the beam 17 occurs whatever the simultaneous horizontal or vertical movement of these elements.

In one typical hologram writing apparatus embodying the principles of this invention the relative disposition of the elements described in the foregoing was conveniently determined by the formula $$\frac{1}{s}+\frac{1}{s'}=\frac{1}{f2}$$

where *s* is the distance from the centerline of the writing lens 16 to the object point *p* of the divergent beam input of the lens 16, *s'* is the distance from the centerline of the writing lens 16 to the focal plane of the divergent beam input, and *f2* is the distance from the writing lens 16 to the focal plane of the latter lens for collimated light—which is here the plane of the surface of the hologram medium 20. In this arrangement the difference between *s'* and *f2* was advantageously determined as 2 percent of *s'*. It is apparent from the drawing that the proportions and relative dimensions of the elements of the apparatus shown do not necessarily conform with the formula stated above. These have been intentionally exaggerated to bring out more clearly the principles of the invention and will, in practice, be given precise values in accordance with the dictates of hologram size, capacity, and other predetermined characteristics.

It will further be understood that what has been described is considered to be only one specific illustrative embodiment of the invention and that various and numerous other arrangements may be devised by one skilled in the art without departing from the spirit and scope of the invention as defined by the accompanying claims.

What I claim is:

1. Hologram-recording apparatus comprising a lens having a first focal point for a collimated light beam input and a second focal point for a diverging light beam input beyond said first focal point, a hologram-recording medium having its recording surface in a plane including said first focal point, an opaque plate located adjacent said recording surface having an aperture therein for defining information page locations on said surface, a data mask station positioned between said lens and said plate in which a plurality of data masks, each transmitting light in accordance with binary information stored therein, are individually and sequentially positioned, said lens and said plate being movable in identical parallel displacement, in planes perpendicular to the optical axis of said lens, with respect to said data mask station and said surface to a new position for each of said data masks, a source of coherent light, means for focusing said coherent light in a diverging beam on said lens; said data station, said recording surface, said source and said focusing means being fixed relative to each other along a common optical axis, and means for directing a reference light beam on said page locations on said recording surface.